United States Patent
Urata

(10) Patent No.: US 12,106,774 B1
(45) Date of Patent: Oct. 1, 2024

(54) MAGNETIC DISK DEVICE AND METHOD OF ADJUSTING ATI REWRITE COUNT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yukio Urata, Sagamihara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/459,202

(22) Filed: Aug. 31, 2023

(30) Foreign Application Priority Data

Mar. 24, 2023 (JP) ................................. 2023-048580

(51) Int. Cl.
    G11B 5/596 (2006.01)
    G11B 5/54 (2006.01)
    G11B 20/10 (2006.01)

(52) U.S. Cl.
    CPC ............................... G11B 20/10388 (2013.01)

(58) Field of Classification Search
    CPC .... G11B 5/00; G11B 5/09; G11B 5/54; G11B 20/1419; G11B 20/12; G11B 27/36; G11B 20/18; G11B 20/1866; G11B 5/6029; G11B 7/00; G11B 7/00736; G11B 7/1263; G11B 20/10009; G11B 20/10481; G11B 6/69627; G11B 3/0619; G11B 5/012; G11B 20/188; G11B 7/1267; G06F 3/064; G06F 3/0608; G06F 3/0676; G06F 3/0653; G06F 3/0604; G06F 3/0656; G96F 3/0659
    USPC ............................................. 360/48
    See application file for complete search history.

(56) References Cited

U.S. PATENT DOCUMENTS

| 9,099,155 | B1 | 8/2015 | Kataria et al. |
| 9,576,604 | B1* | 2/2017 | Inamura ............... G11B 19/041 |
| 10,490,223 | B2 | 11/2019 | Isokawa |
| 10,546,601 | B1 | 1/2020 | Ichihara |
| 2010/0188767 | A1 | 7/2010 | Hirose et al. |
| 2019/0295596 | A1 | 9/2019 | Urata |
| 2022/0076695 | A1 | 3/2022 | Shibasaki |

FOREIGN PATENT DOCUMENTS

JP 2019-164869 A 9/2019

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk device includes a disk, a head, a storage unit, and a controller. The storage unit stores a reference table and an adjustment table. The reference table has a plurality of reference counts, which are m reference counts. The adjustment table has a plurality of adjustment values, which are n adjustment values. The controller includes a detector, an adjustment unit that adjusts a reference count corresponding to a case where abnormality information is detected to an ATI rewrite count having a numerical value different from the reference count, a counter, a determination unit, and a refresh processing unit.

10 Claims, 11 Drawing Sheets

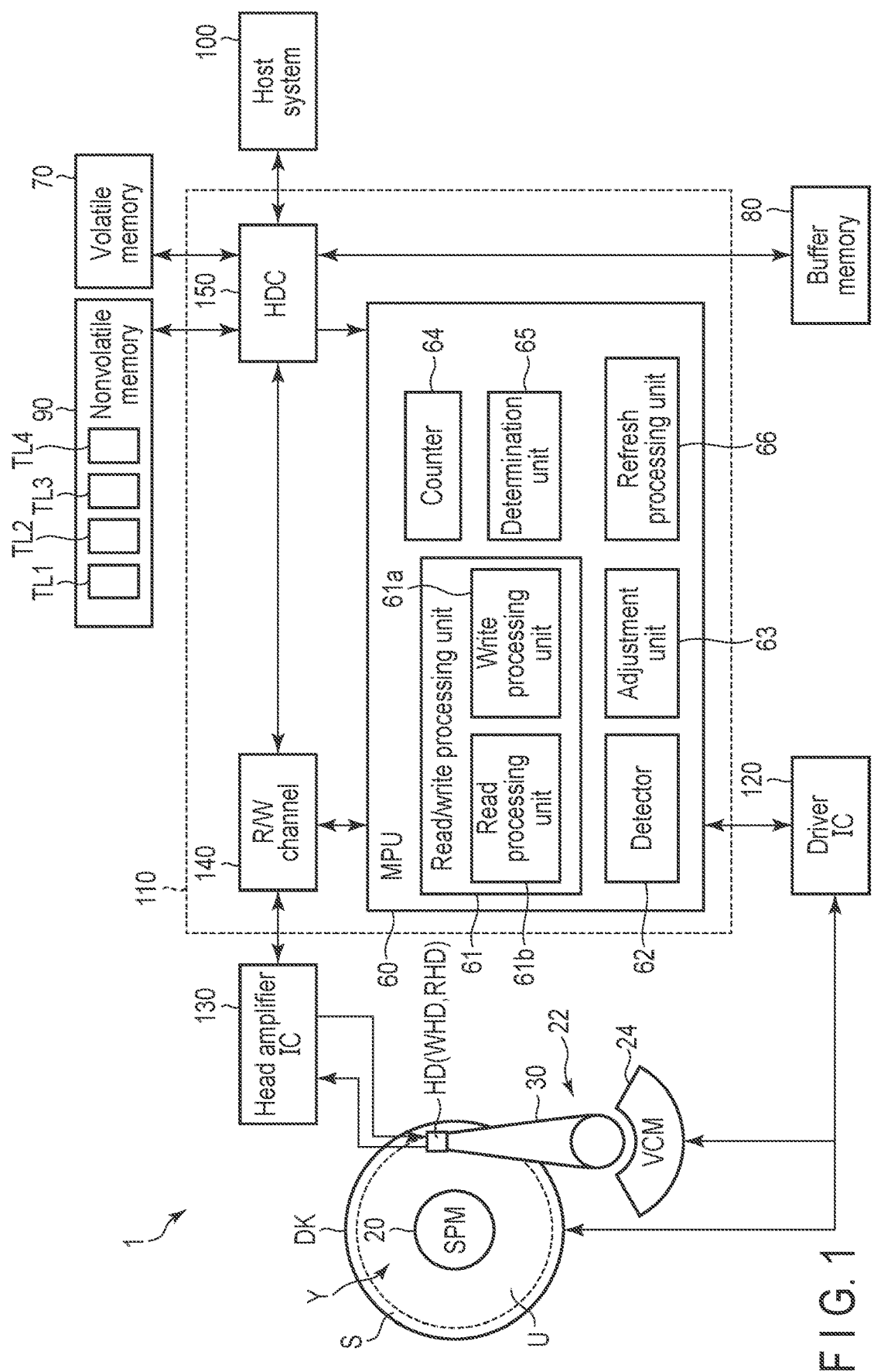
F I G. 1

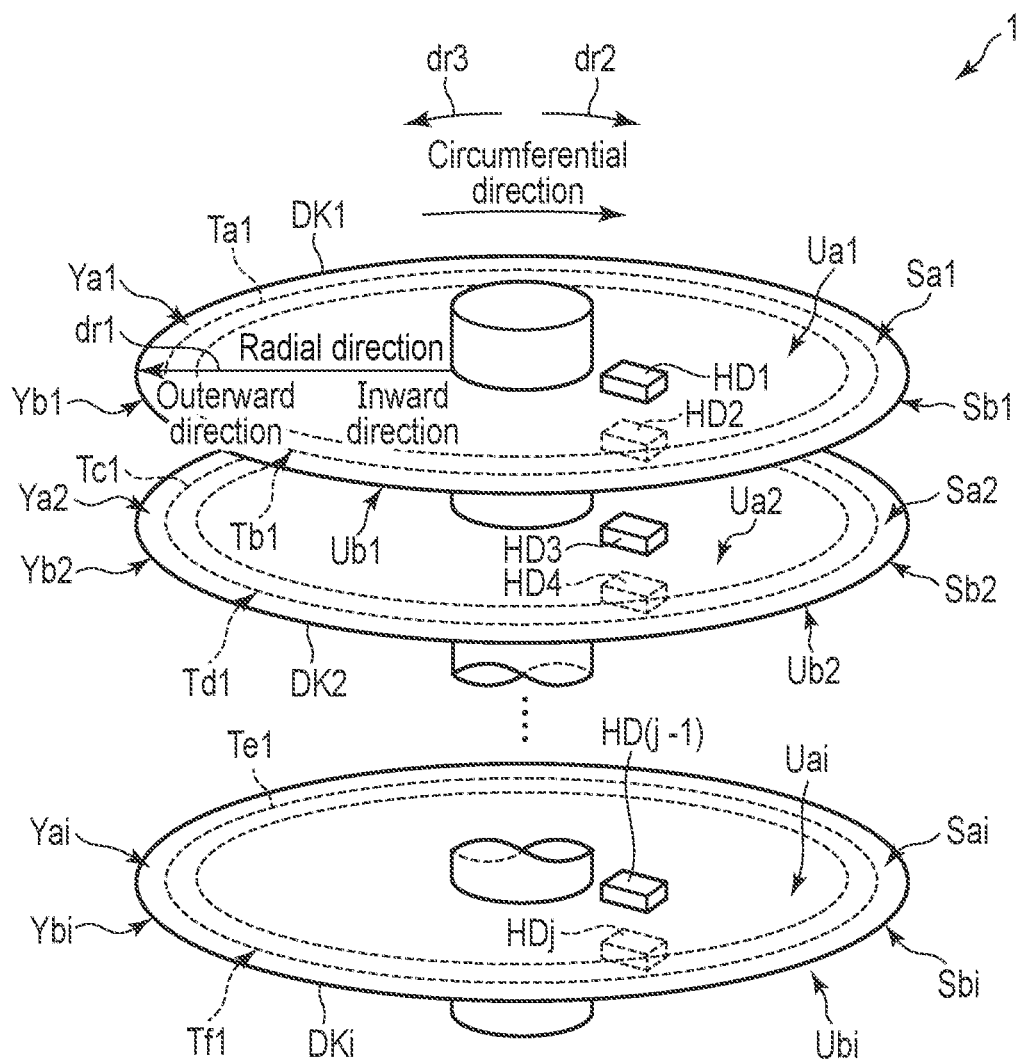
F I G. 2

| Head | Zone | Guaranteed number of writes ||||
|---|---|---|---|---|---|
| | | Division 1 | Division 2 | ... | Division p |
| HD1 | Zone 0 | 1503 | 1460 | ... | 1497 |
| | Zone 1 | 1488 | 1404 | ... | 1367 |
| | Zone 2 | 1488 | 1409 | ... | 1558 |
| | ... | ... | ... | ... | ... |
| | Zone x | 1202 | 1224 | ... | 1115 |
| HD2 | Zone 0 | 1232 | 1283 | ... | 1208 |

FIG. 7

| Head | Zone | Division | Guaranteed number of writes ||||| |
|---|---|---|---|---|---|---|---|---|
| | | | Division 1 | Division 2 | Division 3 | ... | Division q-1 | Division q |
| HD1 | Zone 0 | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |
| | Zone 1 | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |
| | Zone 2 | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |
| | ... | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |
| | Zone x | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |
| HD2 | Zone 0 | Div0 | 1.00 | 1.00 | 1.00 | ... | 1.00 | 1.00 |
| | | Div1 | 1.00 | 1.00 | 1.00 | | 1.00 | 1.00 |
| | | ... | ... | ... | ... | | ... | ... |
| | | Divk | 1.00 | 1.00 | 1.00 | | 1.00 | 1.00 |

FIG. 8

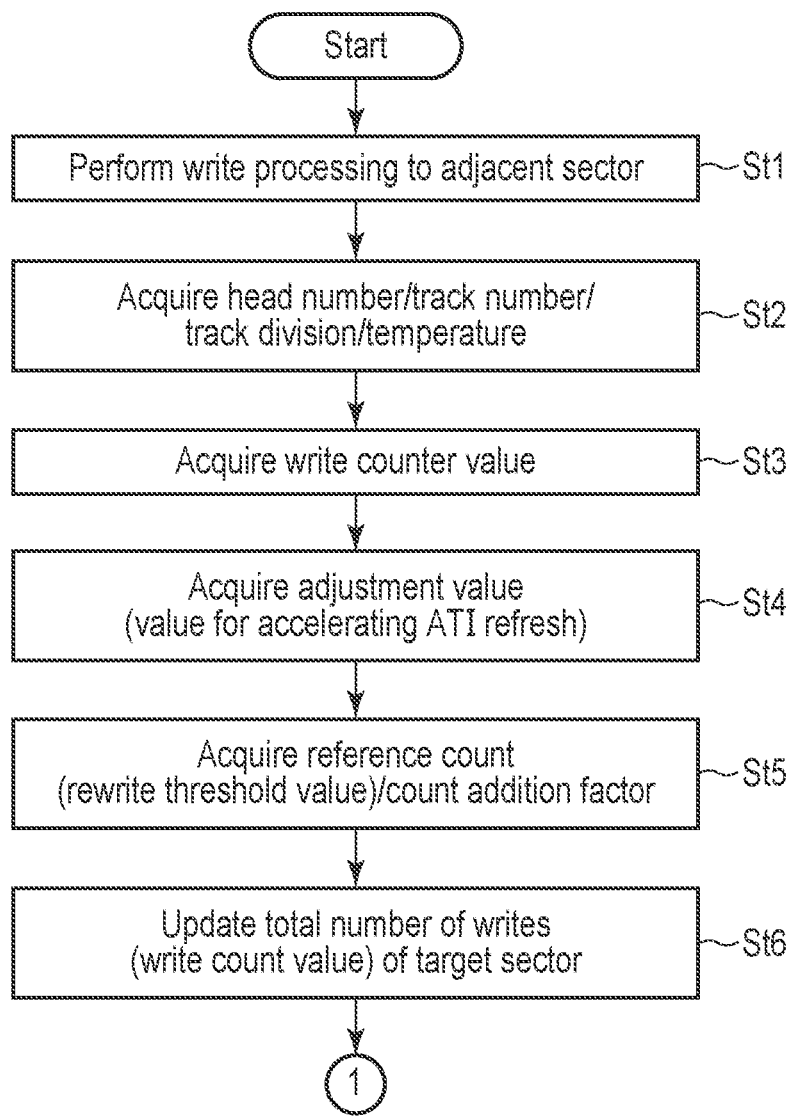
F I G. 10

MAGNETIC DISK DEVICE AND METHOD OF ADJUSTING ATI REWRITE COUNT

CROSS-REFERENCE TO RELATED APPLICATIONS

This application is based upon and claims the benefit of priority from Japanese Patent Application No. 2023-048580, filed Mar. 24, 2023, the entire contents of which are incorporated herein by reference.

FIELD

Embodiments described herein relate generally to a magnetic disk device and a method of adjusting ATI rewrite count.

BACKGROUND

As a magnetic disk device, a conventional magnetic recording (CMR) (or a conventional recording) magnetic disk device that writes a plurality of tracks at intervals in the radial direction of a disk, a shingled write magnetic recording (SMR, or shingled write recording (SWR)) magnetic disk device that overwrites a plurality of tracks in the radial direction of the disk, and a hybrid recording magnetic disk device that selectively executes the conventional magnetic recording and the shingled write magnetic recording are known.

BRIEF DESCRIPTION OF THE DRAWINGS

FIG. 1 is a block diagram showing a configuration of a magnetic disk device according to one embodiment.

FIG. 2 is a perspective view showing a part of the magnetic disk device, and shows a plurality of disks and a plurality of heads.

FIG. 7 shows a part of a reference table shown in FIG. 1, showing a plurality of reference counts, etc., corresponding to a first recording layer.

FIG. 8 shows a part of an adjustment table shown in FIG. 1, showing a plurality of adjustment values, etc., corresponding to the first recording layer.

FIG. 10 is a flowchart for explaining a refresh processing method applied to the magnetic disk device.

DETAILED DESCRIPTION

Figure 3:
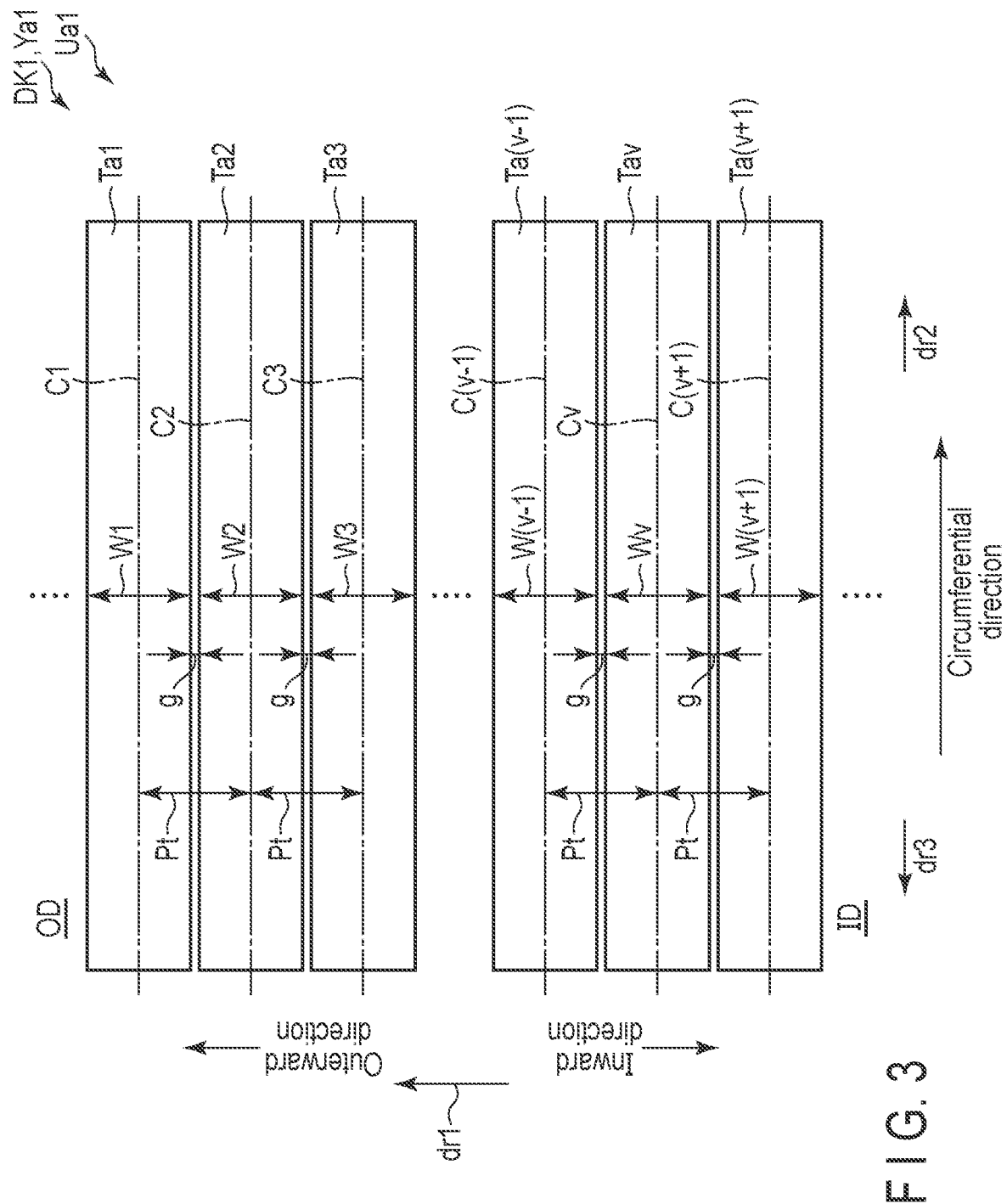
FIG. 3 is a schematic diagram showing part of a plurality of tracks on which conventional magnetic recording processing is performed.

In general, according to one embodiment, there is provided a magnetic disk device comprising: a disk having a recording layer, the recording layer including a plurality of divided regions, which are m regions, in a case of being divided into m pieces in at least one of a radial direction and a circumferential direction, and a plurality of adjustment regions, which are n regions, in a case of being divided into n regions, which is larger in number than the m regions, in at least one of the directions; a head that writes data to the recording layer and reads data from the recording layer; a storage unit storing a reference table holding a plurality of reference counts corresponding to the recording layer and an adjustment table holding a plurality of adjustment values corresponding to the recording layer, in which the plurality of reference counts are m reference counts corresponding one-to-one to the plurality of divided regions, and the plurality of adjustment values are n adjustment values corresponding one-to-one to the plurality of adjustment regions; and a controller. The controller includes a detector that detects a state of the recording layer and a characteristic of the head, an adjustment unit that, in a case where the detector detects normality information indicating that the state and the characteristic are normal, adjusts each of the reference counts to an ATI rewrite count having the same numerical value as the reference count without updating each of the adjustment values, and, in a case where the detector detects abnormality information indicating that one of the state and the characteristic is abnormal, updates a corresponding adjustment value among the plurality of adjustment values and adjusts a corresponding reference count among the plurality of reference counts based on the corresponding adjustment value to the ATI rewrite count having a numerical value different from the reference count, a counter that, each time data is written to an adjacent sector adjacent to a target sector of the recording layer in a radial direction, counts number of writes in the target sector and records the number of writes in the storage unit, a determination unit that determines whether or not a total number of the writes recorded in the storage unit exceeds the ATI rewrite count, and a refresh processing unit that, when the total exceeds the ATI rewrite count, reads target data in the target sector, rewrites the target data to the target sector, and resets the number of writes of the target sector recorded in the storage unit.

According to another embodiment, there is provided a method of adjusting ATI rewrite count which is applied to a magnetic disk device including a disk having a recording layer, the recording layer including a plurality of divided regions, which are m regions, in a case of being divided into m pieces in at least one of a radial direction and a circumferential direction, and a plurality of adjustment regions, which are n regions, in a case of being divided into n regions, which is larger in number than the m regions, in at least one of the directions; a head that writes data to the recording layer and reads data from the recording layer, a storage unit storing a reference table holding a plurality of reference counts corresponding to the recording layer and an adjustment table holding a plurality of adjustment values corresponding to the recording layer, in which the plurality of reference counts are m reference counts corresponding one-to-one to the plurality of divided regions, and the plurality of adjustment values are n adjustment values corresponding one-to-one to the plurality of adjustment regions, and a controller. The method of adjusting ATI rewrite count comprises detecting a state of the recording layer and characteristics of the head, in a case of detecting normality information indicating that the state and the characteristic are normal, adjusting each of the reference counts to an ATI rewrite count having the same numerical value as the reference count without updating each of the adjustment values, and, in a case of detecting abnormality information indicating that one of the state and the characteristic is abnormal, updating a corresponding adjustment value among the plurality of adjustment values and adjusting a corresponding reference count among the plurality of reference counts based on the corresponding adjustment value to the ATI rewrite count having a numerical value different from the reference count, each time data is written to an adjacent sector adjacent to a target sector of the recording layer in a radial direction, counting number of writes in the target sector and recording the number of writes in the storage unit, determining whether or not a total number of the writes recorded in the storage unit exceeds the ATI rewrite count, and, when the total exceeds the ATI rewrite count, reading target data in the target sector, rewriting the target data to the target sector, and resetting the number of writes of the target sector recorded in the storage unit.

The following is a detailed description of a magnetic disk device 1 and a method of adjusting ATI rewrite count according to one embodiment with reference to the drawings. First, a configuration of the magnetic disk device 1 will be described. FIG. 1 is a block diagram showing the configuration of the magnetic disk device 1 in the present embodiment. In the present embodiment, the magnetic disk device 1 is a conventional magnetic recording magnetic disk device. However, the technology described below may be applied to a shingled write magnetic recording magnetic disk device and a hybrid recording magnetic disk device that selects and executes the conventional magnetic recording and the shingled write magnetic recording.

As shown in FIG. 1, the magnetic disk device 1 comprises a plurality, e.g., one to six disks (magnetic disks) DK as recording media, a spindle motor (SPM) 20 as a drive motor, a head stack assembly 22, a driver IC 120, a head amplifier integrated circuit (hereinafter referred to as head amplifier IC, or preamplifier) 130, a volatile memory 70, a buffer memory (buffer) 80, a nonvolatile memory 90, and a system controller 110, which is a single-chip integrated circuit. The magnetic disk device 1 is also connected to a host system (hereinafter referred to simply as "host") 100.

Each disk DK is formed with a diameter of 95 mm (3.5 inches), for example, and has recording layers (magnetic recording layers) Y on both sides thereof. Note that, in the present embodiment, the magnetic disk device 1 comprises one to six disks DK, but the number of disks DK is not limited thereto. The magnetic disk device 1 may also comprise a single disk DK.

The head stack assembly 22 controls the movement of a head HD on an arm 30 to a target position on the disk DK by driving a voice coil motor (hereinafter referred to as VCM) 24.

The disk DK has a user data area U that can be used by a user and a system area S in which information necessary for system management is written allocated in an area where data can be written. Here, any track among a plurality of tracks on the disk DK is a target track, and a track adjacent to the target track in a radial direction of the disk DK is an adjacent track. In the target track, any sector among a plurality of sectors aligned in a circumferential direction of the disk DK is a target sector. In the adjacent track, a sector adjacent to the target sector in the radial direction of disk DK among the plurality of sectors aligned in the circumferential direction of disk DK is an adjacent sector.

The head HD records and reproduces information on the disk DK. The head HD has a slider as its main body and a write head WHD and read head RHD mounted on the slider. The write head WHD writes data with respect to the recording layer Y of the disk DK. The read head RHD reads data from a data track of the recording layer Y of the disk DK.

The driver IC 120 controls the drive of the SPM 20 and the VCM 24 according to the control of the system controller 110 (specifically, an MPU 60 described below). The SPM 20 supports and rotates a plurality of disks DK.

The head amplifier IC 130 comprises a read amplifier and a write driver. The read amplifier amplifies a read signal read from the disk DK and outputs it to the system controller 110 (specifically, a read/write (R/W) channel 140 described below). The write driver outputs a write current corresponding to a signal output from the R/W channel 140 to the head HD.

The volatile memory 70 is a semiconductor memory that loses stored data when the power supply is cut off. The volatile memory 70 stores data, etc., necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data, etc., transmitted and received between the magnetic disk device 1 and the host 100. Note that the buffer memory 80 may be integrally configured with the volatile memory 70. The buffer memory 80 is, for example, a DRAM, a static random access memory (SRAM), an SDRAM, a ferroelectric random access memory (FeRAM), or a magnetoresistive random access memory (MRAM).

The nonvolatile memory 90 is a semiconductor memory that records stored data even when the power supply is cut off. The nonvolatile memory 90 is, for example, a NOR or NAND type flash ROM (flash read only memory (FROM)).

In the present embodiment, the nonvolatile memory 90 functions as a storage unit that stores various tables, etc. For example, the nonvolatile memory 90 stores a reference table TL1 with a plurality of reference counts, an adjustment table TL2 with a plurality of adjustment values, a read retry table TL3 with read retry threshold values, and a head characteristics table TL4 with head characteristics threshold values.

Note that the storage unit for storing the various tables, etc., is not limited to the nonvolatile memory 90, but may be any recording unit within the magnetic disk device 1, for example, the system area S.

The system controller (controller) 110 is realized, for example, using a large-scale integrated circuit (LSI), referred to as a system-on-a-chip (SoC), in which a plurality of elements are integrated on a single chip. The system controller 110 includes the read/write (R/W) channel 140, a hard disk controller (HDC) 150, and the microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 according to an instruction from the MPU 60 described below. The R/W channel 140 has a circuit or a function of modulating the write data. The R/W channel 140 also has a circuit or a function of measuring a signal quality of the read data. The R/W channel 140 is electrically connected to, for example, the head amplifier IC 130, the HDC 150, and the MPU 60.

The HDC 150 controls data transfer between the host 100 and the R/W channel 140 in response to an instruction from the MPU 60 as described below. The HDC 150 is electrically connected to, for example, the R/W channel 140, the MPU 60, the volatile memory 70, the buffer memory 80, the nonvolatile memory 90, etc.

The MPU 60 is a controller that controls each unit of the magnetic disk device 1 and is a main controller. The MPU 60 controls the VCM 24 via the driver IC120 and executes servo control for positioning the head HD. The MPU 60 controls write-operations of data to the disk DK and selects a storage destination of write data transferred from the host 100. Furthermore, the MPU 60 controls read-operations of data from the disk DK and controls processing of read data transferred from the disk DK to the host 100. The MPU 60 is connected to each unit of the magnetic disk device 1. The MPU 60 is electrically connected to, for example, the driver IC 120, the R/W channel 140, the HDC 150, etc.

The MPU 60 comprises a read/write processing unit 61, a detector 62, an adjustment unit 63, a counter 64, a determination unit 65, and a refresh processing unit 66. The MPU 60 executes, on firmware, processing of each unit, for example, the read/write processing unit 61, the detector 62, the adjustment unit 63, the counter 64, the determination unit 65, the refresh processing unit 66, etc. Note that the MPU 60 may comprise each of these units as a circuit.

The read/write processing unit 61 has a write processing unit 61a and a read processing unit 61b. In accordance with commands from the host 100, the write processing unit 61a controls the write processing of data to the recording layer Y of the disk DK, and the read processing unit 61b controls the read processing of data from the recording layer Y of the disk DK. The read/write processing unit 61 controls the VCM 24 via the driver IC 120 to position the head HD at a target position (predetermined radius position) on the disk DK and execute the read or write processing.

The detector 62 can detect the state of the recording layer Y of the disk DK and the characteristics of the head HD. For example, the detector 62 can detect normality information indicating that the state of the recording layer Y and the characteristics of the head HD are normal. The detector 62 may detect abnormality information indicating that one of the state of the recording layer Y and the characteristics of the head HD is abnormal.

The state of the recording layer Y of the disk DK is the readability of data in the recording layer Y based on both the physical and magnetic state of the recording layer Y and the characteristics of the head HD.

For example, the detector 62 can detect whether or not the data in the recording layer Y is recoverable. When the data in the recording layer Y is recoverable, it means that the data in the recording layer Y is in a state where refresh processing can be performed satisfactorily (original data in the recording layer Y can be read, and the original data can be rewritten in the recording layer Y). When the data in the recording layer Y is unrecoverable, it means that the data in the recording layer Y is in a state where the refresh processing cannot be performed satisfactorily (original data in the recording layer Y cannot be read).

The detector 62 can also detect whether or not the data is data that requires a read retry when reading.

Furthermore, the detector 62 can detect whether or not data is data that requires a read retry upon refresh processing.

When the detector 62 detects the characteristics of the head HD, it means that it may detect a read characteristic value and a write characteristic value of the head HD. The read characteristic value is a value indicating the read processing characteristics of the head HD, and the write characteristic value is a value indicating the write processing characteristics of the head HD. For example, the read characteristic value can be obtained by measuring an error rate of the read processing, and the write characteristic value can be obtained by measuring an error rate of the write processing.

The characteristics of the head HD change as the head HD is damaged by contact of the head HD with the disk DK or as the head HD deteriorates over time. Therefore, the detector 62 can detect the characteristics of the head HD (e.g., error rate). The detector 62 can detect the characteristics of the head HD immediately (initially) after starting to use the magnetic disk device 1. Also, after starting to use the magnetic disk device 1, the detector 62 can detect the characteristics of the head HD on a regular basis. Thereby, the detector 62 can periodically detect the deterioration amount of the characteristics of the head HD.

The detector 62 can detect first abnormality information in a case where the data in the recording layer Y becomes unrecoverable.

The detector 62 can detect second abnormality information in a case where the number of reads of the same data in the recording layer Y by the read processing unit 61b exceeds a read retry threshold value in the read retry table TL3. For example, a first read retry can be read under the same conditions, and a second read retry can be read with an offset.

The detector 62 can detect third abnormality information in a case where a read retry of the data in the recording layer Y is retried by the refresh processing unit 66.

The detector 62 can detect fourth abnormality information in a case where a deterioration amount a of the head HD characteristics exceeds a head characteristics threshold value in the head characteristics table TL4.

In a case where normality information is detected, the adjustment unit 63 does not update each adjustment value of the adjustment table TL2, but adjusts each reference count of the reference table TL1 to an ATI rewrite count. In such a case, the ATI rewrite count has the same numerical value as the reference count.

In a case where abnormality information is detected, the adjustment unit 63 updates a corresponding adjustment value among the plurality of adjustment values in the adjustment table TL2 and adjusts a corresponding reference count among the plurality of reference counts in the reference table TL1 to an ATI rewrite count based on the corresponding adjustment value. In such a case, the ATI rewrite count has a different numerical value from the reference count.

For example, in a case where the detector 62 detects abnormality information, the ATI rewrite count that is adjusted based on the updated adjustment value is a numerical value smaller than the corresponding reference count. The MPU 60 can predict a region of the recording layer Y where read errors are likely to occur by detecting the abnormality information. Here, the occurrence of a read error indicates an unrecovered state. The MPU 60 can adjust only the ATI rewrite count corresponding to the region where the read error is predicted to occur more easily among the plurality of ATI rewrite count to a smaller numerical value. As a result, the MPU 60 can minimize the deterioration of performance due to activation of refresh while avoiding data read errors in the recording layer Y.

Figure 4:
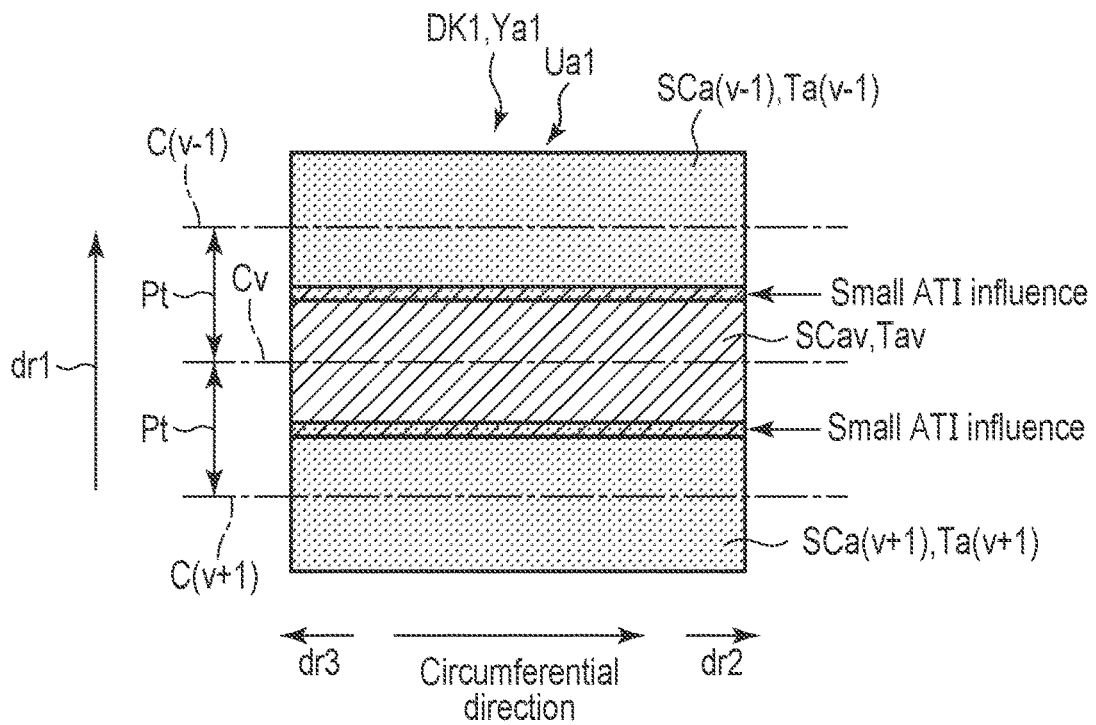
FIG. 4 is a schematic diagram showing three sectors arranged in a radial direction of the magnetic disk device, and illustrates a case where an ATI influence on a target sector is small.

As shown in FIG. 1 and FIG. 4, the counter 64 counts the number of writes of a target sector (sector SCav) of the recording layer Y each time data is written to adjacent sectors (sector SCa(v−1) and sector SCa(v+1)) adjacent to the target sector (sector SCav) in the radial direction dr1, and records the number of writes in the nonvolatile memory 90 (storage unit). In other words, the counter 64 can update the total number of writes of the target sector (sector SCav).

For example, the nonvolatile memory 90 (storage unit) may further store a plurality of count addition factors. In such a case, the counter 64 can count the number of writes based on the plurality of count addition factors. For example, in a case where the influence of adjacent track interference (ATI) on the target sector (sector SCav) is small when data is written to the adjacent sector (sector SCa(v−1)), the counter 64 can select a count addition factor that is "1" from the nonvolatile memory 90 and count the number of writes of the target sector (sector SCav) as "1" time.

Figure 5:
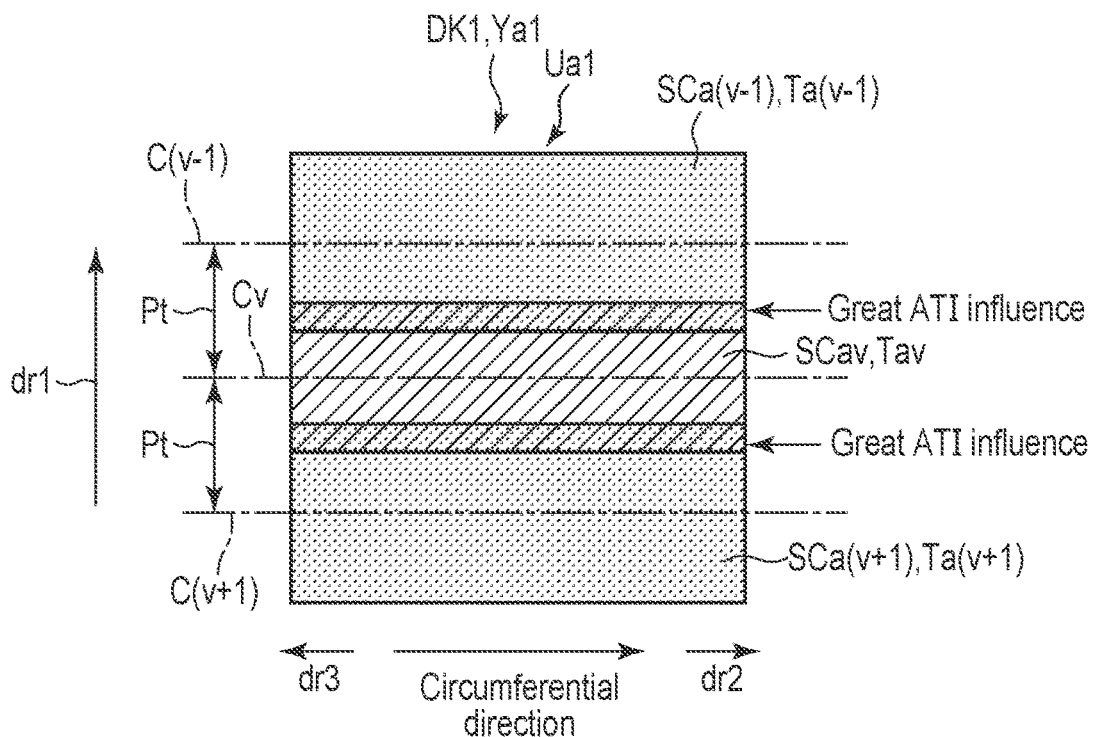
FIG. 5 is a schematic diagram showing three sectors arranged in a radial direction of the magnetic disk device, and illustrates a case where an ATI influence on a target sector is great.

As shown in FIG. 1 and FIG. 5, on the other hand, in a case where the influence of ATI on the target sector (sector SCav) is great when data is written to the adjacent sector (sector SCa(v−1)), the counter 64 can select the count addition factor that is "1.5" from the nonvolatile memory 90 and count the number of writes of the target sector (sector SCav) as "1.5" times.

Note that, when data is written to the sector SCa(v−1), the counter 64 increases the total number of writes of the sector SCav by adding "1", for example, but updates the total number of writes of the sector SCa(v−1) to "1" time.

As shown in FIG. 1, the determination unit 65 can determine whether or not the total number of writes recorded in the nonvolatile memory 90 (storage unit) has exceeded the above ATI rewrite count.

As shown in FIG. 1 and FIG. 4, the refresh processing unit 66 can perform refresh processing when the total number of writes in the target sector (sector SCav) exceeds the above ATI rewrite count. That is, the refresh processing unit 66 can read the target data in the target sector (sector SCav), rewrite the above target data to the target sector, and reset the number of writes in the target sector recorded in the nonvolatile memory 90 (storage unit) to "0" times.

FIG. 2 is a perspective view showing a part of the magnetic disk device 1, showing a plurality of disks DK and a plurality of heads HD.

As shown in FIG. 2, a direction in which the disk DK rotates in a circumferential direction is referred to as a rotational direction dr3. Note that, in the example shown in FIG. 2, the rotational direction is shown as counterclockwise, but it may also be in an opposite direction (clockwise). In addition, a traveling direction dr2 of the head HD with respect to the disk DK is opposite to the rotational direction dr3. The traveling direction dr2 is a direction in which the head HD sequentially writes and reads data to and from the disk DK in the circumferential direction, i.e., a direction in which the head HD travels with respect to the disk DK in the circumferential direction. In addition, in a radial direction dr1 of disk DK, a direction toward the outer circumference of disk DK is referred to as an outward direction (outside), and a direction opposite to the outward direction is referred to as an inward direction (inside).

The magnetic disk device 1 comprises i disks, from disk DK1 to disk DKi, and j heads, from head HD1 to head HDj. In the present embodiment, the number of heads HD is twice the number of disks DK (j=2·i).

The disks DK1 to DKi are coaxially provided and are stacked at intervals from each other. The diameters of the disks DK1 to DKi are the same. Here, the terms "same", "identical", "matching", "equivalent", etc., not only mean exactly the same, but also includes the meaning of different to an extent that can be considered as substantially the same. Note that the diameters of the disks DK1 to DKi may be different from each other.

Each disk DK has a recording layer Y on both sides. For example, the disk DK1 has a first recording layer Ya1 and a second recording layer Yb1 on the opposite side of the first recording layer Ya1. The disk DK2 has a first recording layer Ya2 and a second recording layer Yb2 on the opposite side of the first recording layer Ya2. The disk DKi has a first recording layer Yai and a second recording layer Ybi on the opposite side of the first recording layer Yai. Each first recording layer Ya may be referred to as a front surface or a recording surface. Each second recording layer Yb may be referred to as a back surface or a recording surface.

As mentioned above, the magnetic disk device 1 in the present embodiment is a conventional magnetic recording magnetic disk device. Therefore, a user data area U of each recording layer Y is a conventional magnetic recording area. In the conventional magnetic recording magnetic disk device, it is permitted to write data randomly in the user data area U, i.e., conventional magnetic recording is permitted.

Each recording layer Y has the user data area U and the system area S.

The first recording layer Ya1 has a user data area Ua1 and a system area Sa1.

The second recording layer Yb1 has a user data area Ub1 and a system area Sb1.

The first recording layer Ya2 has a user data area Ua2 and a system area Sa2.

The second recording layer Yb2 has a user data area Ub2 and a system area Sb2.

The first recording layer Yai has a user data area Uai and a system area Sai.

The second recording layer Ybi has a user data area Ubi and a system area Sbi.

In the user data area Ua1 (the first recording layer Ya1), a track sandwiched between double dashed lines in the drawing is track Ta1. In the user data area Ub1 (the second recording layer Yb1), a track located on the opposite side of the track Ta1 is track Tb1.

In the user data area Ua2 (the first recording layer Ya2), a track sandwiched between double dashed lines in the drawing is track Tc1. In the user data area Ub2 (the second recording layer Yb2), a track located on the opposite side of track Tc1 is track Td1.

In the user data area Uai (the first recording layer Yai), a track sandwiched between double dashed lines in the drawing is track Tel. In the user data area Ubi (the second recording layer Ybi), a track located on the opposite side of track Tel is track Tf1.

In the present embodiment, the tracks Ta1, Tb1, Tc1, Td1, Tel, and Tf1 are located on the same cylinder.

The head HD faces the disk DK. In the present embodiment, one head HD faces each recording layer Y of the disk DK. For example, the head HD1 faces the first recording layer Ya1 of the disk DK1, writes data to the first recording layer Ya1 and reads data from the first recording layer Ya1. The head HD2 faces the second recording layer Yb1 of the disk DK1, writes data to the second recording layer Yb1, and reads data from the second recording layer Yb1. A head HD3 faces the first recording layer Ya2 of the disk DK2, writes data to the first recording layer Ya2, and reads data from the first recording layer Ya2. A head HD4 faces the second recording layer Yb2 of the disk DK2, writes data to the second recording layer Yb2, and reads data from the second recording layer Yb2. A head HDj−1 faces the first recording layer Yai of disk DKi, writes data to the first recording layer Yai, and reads data from the first recording layer Yai. The head HDj faces the second recording layer Ybi of a disk DKi, writes data to the second recording layer Ybi, and reads data from the second recording layer Ybi.

FIG. 3 is a schematic diagram showing a part of a plurality of tracks where the conventional magnetic recording processing.

As shown in FIG. 3, the first recording layer Ya1 of the disk DK1 has tracks Ta1, Ta2, Ta3, . . . , Ta(v−1), Tav, Ta(v+1), etc., aligned in the radial direction dr1. In the drawing, the track Ta1 is located on an outermost circumference OD side of the disk DK1, and the track Ta(v+1) is located on an innermost circumference ID side of the disk DK1.

The track Ta1 has a track width W1 in the radial direction dr1 and a track center C1 in the center of the radial direction dr1. Similar to the track Ta1, the track Ta2 has a track width W2 and a track center C2, the track Ta3 has a track width W3 and a track center C3, the track Ta(v−1) has a track width W(v−1) and a track center C(v−1), the track Tav has a track width Wv and a track center Cv, and the track Ta(v+1) has a track width W(v+1) and a track center C(v+1). Track widths W1 to W(v+1) are identical. However, the track widths W1 to W(v+1) may also differ from each other.

The tracks Ta1 to Ta(v+1) are arranged in the radial direction dr1 at a pitch (conventional magnetic recording track pitch) Pt. For example, the track center C1 and the track center C2 are separated by the pitch Pt in the radial direction dr1, and the track center C2 and the track center C3 are separated by the pitch Pt in the radial direction dr1. In addition, the track center C(v−1) and the track center Cv are separated by the pitch Pt in the radial direction dr1, and the track center Cv and the track center C(v+1) are separated by the pitch Pt in the radial direction dr1. Note that the tracks Ta1 to Ta(v+1) may be arranged at different pitches in the radial direction dr1, respectively.

In the conventional magnetic recording magnetic disk device, high density can be achieved by designing the pitch Pt narrower to increase storage capacity.

In the example shown in FIG. 3, the tracks Ta1 to Ta(v+1) are arranged with a gap g in the radial direction dr1, respectively. For example, the track Ta1 and the track Ta2 are separated by the gap g in the radial direction dr1, and the track Ta2 and the track Ta3 are separated by the gap g in the radial direction dr1. In addition, the track Ta(v−1) and track Tav are separated by the gap g in the radial direction dr1, and the track Tav and the track Ta(v+1) are separated by the gap g in the radial direction dr1. Note that the tracks Ta1 to Ta(v+1) may be placed at different gaps from each other.

In FIG. 3, each track Ta is shown as a rectangle for convenience of explanation, but in reality, each track Ta is curved along the circumferential direction. Furthermore, each track may have a wave shape extending in the circumferential direction while varying in the radial direction dr1.

When executing normal write processing, the write processing unit 61a positions the head HD1 at the track center C1 and writes data to the track Ta1, positions the head HD1 at the track center C2 and writes data to the track Ta2, positions the head HD1 at the track center C3 and writes data to the track Ta3, positions the head HD1 at the track center C(v−1) and writes data to the track Ta(v−1), positions the head HD1 at the track center Cv and writes data to the track Tav, and positions the head HD1 at the track center C(v+1) and writes data to the track Ta(v+1).

In the example shown in FIG. 3, the write processing unit 61a may execute write processing sequentially to the tracks Ta1 to Ta(v+1) or randomly to predetermined sectors of each of the tracks Ta1 to Ta (v+1).

FIG. 4 is a schematic diagram of three sectors SCa(v−1), SCav, and SCa(v+1) aligned in the radial direction dr1 of the magnetic disk device 1, illustrating a case where the ATI influence on the sector SCav is small. FIG. 5 is a schematic diagram of the above three sectors SCa(v−1), SCav, and SCa(v+1), illustrating a case where the ATI influence on the sector SCav is great.

In FIG. 4 and FIG. 5, a region where data write processing targeting the sector SCav was performed is shaded, and a region where data write processing targeting the sector SCa(v−1) was performed and a region where data write processing targeting the sector SCa(v+1) was performed are shown by dot patterns.

As shown in FIG. 4 and FIG. 5, the track Tav has the sector SCav. The track Ta(v−1) has the sector SCa(v−1) adjacent to the sector SCav in the radial direction dr1. The track Ta(v+1) has the sector SCa(v+1) adjacent to the sector SCav in radial direction dr1.

Hereinafter, the track Tav is referred to as the target track Tav, the track Ta(v−1) is referred to as the adjacent track Ta(v−1), and the track Ta(v+1) is referred to as the adjacent track Ta(v+1). The adjacent track Ta(v+1) is an inner adjacent track located on the inner side of the target track Tav. The adjacent track Ta(v−1) is an outer adjacent track located on the outer side of the target track Tav.

The sector SCav is referred to as the target sector SCav, the sector SCa(v−1) is referred to as the adjacent sector SCa(v−1), and the sector SCa(v+1) is referred to as the adjacent sector SCa(v+1). The adjacent sector SCa(v+1) is an inner adjacent sector adjacent to the target sector SCav in the radial direction dr1. The adjacent sector SCa (v−1) is an outer adjacent sector adjacent to the target sector SCav in the radial direction dr1.

As shown in FIG. 4, even if data write processing is performed on the adjacent sector SCa(v−1) or on the adjacent sector SCa(v+1), the ATI influence on the data in the target sector SCav may be small.

As shown in FIG. 5, however, when data write processing is performed on the adjacent sector SCa(v−1) or on the adjacent sector SCa(v+1), the ATI influence on the data in the target sector SCav or its neighboring region may become great.

Furthermore, in a case where data is written to the adjacent sectors SCa(v−1) and SCa(v+1) many times, data is also written (overwritten) in the vicinity of each of a boundary between the adjacent sector SCa(v−1) and the target sector SCav, and a boundary between the adjacent sector SCa(v+1) and the target sector SCav each time. If the number of writes to the adjacent sectors SCa(v−1) and SCa(v+1) increases, the original target data in the target sector SCav may become unreadable.

Because of the above, in consideration of the ATI influence, the magnetic disk device 1 performs refresh processing which is referred to as an ATI refresh operation in a case where the total number of writes to the adjacent sectors SCa(v−1) and SCa(v+1) exceeds the ATI rewrite count. The processing to refresh the target sector SCav is processing to read the data in the target sector SCav and rewrite the read data to the target sector SCav. This avoids in advance a situation where the original target data in the target sector SCav cannot be read due to the ATI influence.

Figure 6:
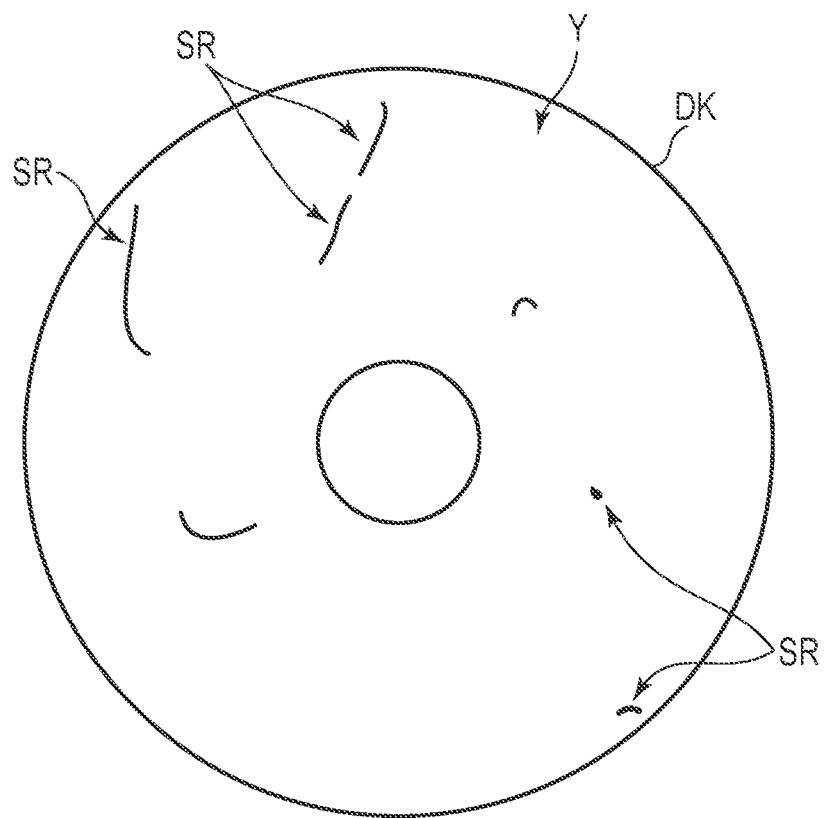
FIG. 6 is a plan view showing a recording layer of a disk of the magnetic disk device, and shows a state in which a recording layer is scratched.

FIG. 6 is a plan view of the recording layer Y of the disk DK of the magnetic disk device 1, showing a state in which the recording layer Y is scratched SR.

As shown in FIG. 6, the ideal state of the recording layer Y is that it has the same characteristics throughout. However, in reality, the recording layer Y has scratches SR, and each layer configuring the recording layer Y is not formed to a uniform thickness throughout, resulting in variations in the physical state of the recording layer Y (surface irregularity).

FIG. 7 shows a part of the reference table TL1 shown in FIG. 1, showing a plurality of reference counts, etc., corresponding to the first recording layer Ya1.

As shown in FIG. 7, the first recording layer Ya1 is divided into m pieces in at least one of the radial direction dr1 and the circumferential direction (track direction). The first recording layer Ya1 includes a plurality of divided regions Ad, which are m regions. In the present embodiment, the first recording layer Ya1 is divided into m pieces in the radial direction dr1 and in the circumferential direction (track direction).

The first recording layer Ya1 is divided into x+1 zones from zone 0 to zone x in the radial direction dr1. The first recording layer Ya1 is divided into p regions from division 1 to division p in the track direction (circumferential direction). Therefore, m=(x+1)×p. The above p should be a natural number (p≥1).

There are m reference counts corresponding to the first recording layer Ya1 held by the reference table TL1, and they correspond one-to-one to the plurality of divided regions Ad. For example, the reference count corresponding to the divided region Ad belonging to division 1 of zone 0 of the first recording layer Ya1 is "1503" times.

The values of the plurality of reference counts corresponding to the first recording layer Ya1 are not identical. This is because the physical condition of the first recording layer Ya1 varies within the surface during the manufacturing process of the magnetic disk device 1. The values of the plurality of reference counts reflect results of measuring ATI resistance of some zones of the first recording layer Ya1 at the time of manufacture. The reference table TL1 is a table set at the time of manufacture. The values of the plurality of reference counts do not reflect results of measuring the ATI resistance of all zones. In the above example, the ATI resistance of zones 3 to x−1 were not measured.

For example, by measuring the ATI resistance of the entire plurality of tracks (full circumference of some tracks) of zone 0 of the recording layer Ya1, the reference count can be set independently for p divided regions Ad of zone 0. Similarly, by measuring the ATI resistance of the entire plurality of tracks (full circumference of some tracks) of zone 1 of the recording layer Ya1, the reference count can be set independently for p divided regions Ad of zone 1; by measuring the ATI resistance of the entire plurality of tracks (full circumference of some tracks) of zone 2 of the recording layer Ya1, the reference count can be set independently for p divided regions Ad of zone 2; and by measuring the ATI resistance of the entire plurality of tracks (full circumference of some tracks) of zone x of the first recording layer Ya1, the reference count can be set independently for p divided regions Ad of zone x.

The reference counts in zones 3 to (x−1) can be set by linearly changing the reference counts in the radial direction dr1. For example, in the case of focusing on division 1 of the recording layer Ya1, by gradually decreasing the reference count in the radial direction dr1 from the reference count "1488" of division 1 of zone 2 to the reference count "1202" of division 1 of zone x, the reference counts from division 1 of zone 3 to division 1 of zone (x−1) can be set.

The ATI resistance is the endurance against ATI. By measuring the ATI resistance of a track, the number of writes that may cause read errors on the above track can be determined. At a timing when power is first turned on to the MPU 60 of the magnetic disk device 1, the reference count in FIG. 7 is the same value as the ATI rewrite count, and the reference count in FIG. 7 is used as it is as the ATI rewrite count. Assuming that the reference count in FIG. 7 continues to be used as the ATI rewrite count, a read error may occur. This is because it is difficult for the reference count in FIG. 7 to comprehend (1) surface irregularity of the first recording layer Ya1, (2) minor scratches and protrusions that are not registered as defective sectors, (3) scratches on the first recording layer Ya1 after the manufacturing of the magnetic disk device 1 is completed, (4) aging deterioration, (5) intensive use of marginal regions in the first recording layer Ya1, etc. Here, the marginal regions are regions just before reaching the ATI rewrite count, regions just before the refresh processing can be made in time, and regions that are likely to become defective. The sectors of the marginal regions are likely to become defective sectors due to receiving damages. For example, in a case where intensive read processing is performed on a marginal region, the region will be physically damaged. In a case where intensive write processing is performed on a marginal region, the region will be magnetically and physically damaged.

FIG. 8 shows a part of the adjustment table TL2 shown in FIG. 1, showing a plurality of adjustment values, etc., corresponding to the first recording layer Ya1.

As shown in FIG. 8, the first recording layer Ya1 is divided into n pieces in at least one of the radial direction dr1 and the circumferential direction (track direction). The first recording layer Ya1 includes a plurality of adjustment regions Aa, which are n regions. In the present embodiment, the first recording layer Ya1 is divided into n pieces in the radial direction dr1 and the circumferential direction (track direction). The above n is a number greater than the above m (n>m).

The first recording layer Ya1 is divided into x+1 zones from zone 0 to zone x in the radial direction dr1. Each zone is further divided into k+1 regions from division Div0 to division Divk in the radial direction dr1. The first recording layer Ya1 is divided into q regions from division 1 to division q in the track direction (circumferential direction). Therefore, n={(x+1)×(k+1)}×q. Note that the above q is an integer and is greater than or equal to the above p (q≥p).

There are n adjustment values corresponding to the first recording layer Ya1 held by the adjustment table TL2, and they correspond one-to-one to the plurality of adjustment regions Aa. At a timing when the power is first turned on to the MPU 60 of the magnetic disk device 1, all adjustment values held by the adjustment table TL2 are identical and are "1.00". Therefore, in the example in FIG. 8, the adjustment values are initially set uniformly to "1.00".

As mentioned above, the magnetic disk device 1 has the adjustment table TL2, and the adjustment table TL2 has a higher resolution than the reference table TL1. In other words, the adjustment table TL2 divides the first recording layer Ya1 more finely than the reference table TL1.

After the timing when the power is first turned on to the MPU 60, the adjustment unit 63 can update the plurality of adjustment values in the adjustment table TL2. When the detector 62 detects the above first abnormality information, second abnormality information, third abnormality information, and fourth abnormality information, the adjustment unit 63 can update one or more corresponding adjustment values in the adjustment table TL2. Therefore, compared to the case where the reference count in the reference table TL1 is adjusted, the ATI rewrite count in the first recording layer Ya1 can be adjusted finely, and a situation where refresh is triggered more than necessary can be reduced. In addition, since the ATI rewrite count can be adjusted based on various types of abnormality information, read errors of data in the recording layer Y can be prevented or reduced.

Figure 9:
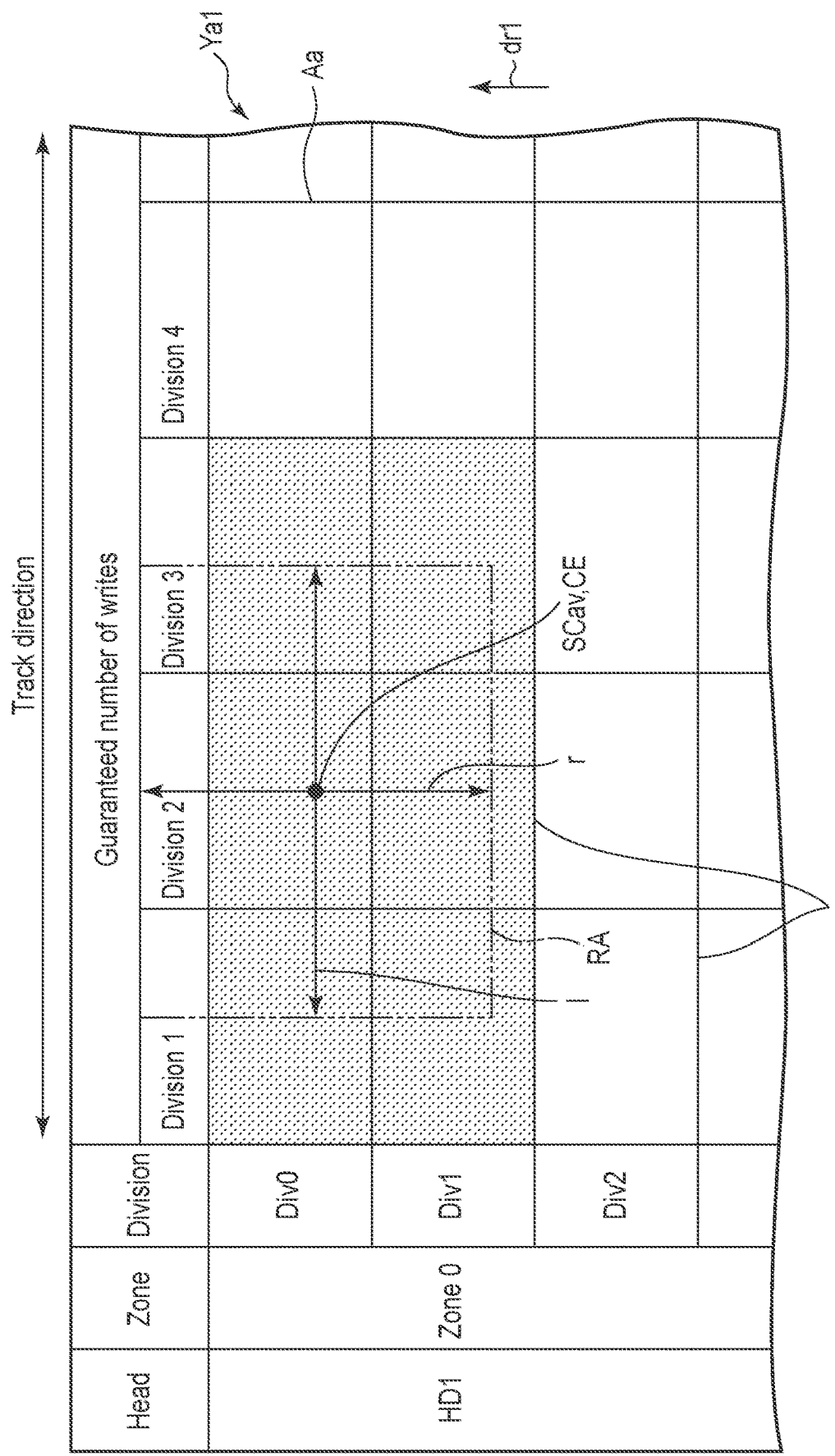
FIG. 9 shows a part of the first recording layer of a disk of the magnetic disk device, and shows a state in which a specific range overlaps one or more adjustment regions.

Next, a case in which the detector 62 detects the first to fourth abnormality information will be explained. FIG. 9 shows a part of the first recording layer Ya1 of the disk DK1 of the magnetic disk device 1, where a specific range RA overlaps one or more adjustment regions Aa.

First, a case in which the detector 62 detects the second abnormality information will be described.

As shown in FIG. 9 and FIG. 1, the nonvolatile memory 90 (storage unit) further stores a weight factor, length r, and width l. For example, the weight factor is a second weight factor b, the length r is a second length r2, and the width l is a second width l2. The range RA has a center of gravity CE. The range RA is, for example, a second range RA2. The second range RA2 is a range of the first recording layer Ya1 with the second length r2 in the radial direction dr1 and the second width l2 in the circumferential direction (track direction).

The detector 62 can detect severe read retries. A severe read retry indicates that the number of retries of the read processing has exceeded a threshold value (read retry threshold value). A read retry occurs in a case where data written to a track was not written around the track center. In a case where the first read processing fails, a first read retry is performed without offsetting the head HD. In a case where the read processing also fails at the first read retry, a second and subsequent read retries are performed while offsetting the head HD and changing the location of the head HD. Read retries are attempted in this manner by changing read processing conditions. In a case where the read processing fails after a specified number of read retries, a special recovery read is tried. In a case where the read processing fails even after trying the special recovery read, i.e., in a case where the number of retries of the read processing exceeds the read retry threshold value, the data in the recording layer Y becomes unrecoverable.

For example, the detector 62 detects the second abnormality information indicating that the number of reads of the target data in the target sector SCav exceeds the read retry threshold value in the read retry table TL3. In such a case, the adjustment unit 63 positions the second range RA2 so that the center of gravity CE of the second range RA2 is located in the target sector SCav. Then, the adjustment unit 63 multiplies all of the adjustment values corresponding to all of the adjustment regions Aa that overlap the second range RA2 among the plurality of adjustment regions Aa by the second weight factor b, and updates each adjustment value multiplied by the second weight factor b to the second adjustment value.

In the present embodiment, the location of the target sector SCav is located at an address represented by a combination of the head number of "HD1", the track number (cylinder number) of "1000", and the track division (sector number) of "200".

In a case where a severe read retry occurs in the target sector SCav, the adjustment unit 63 can update the adjustment value of each of all adjustment regions Aa overlapping the second range RA2 extended in the radial direction dr1 and the circumferential direction centered on the target sector SCav to the second adjustment value.

In the example shown in FIG. 9, the range RA (second range RA2) overlaps a total of six adjustment regions Aa in zone 0 of the first recording layer Ya1: three adjustment regions Aa belonging to division 1, division 2, and division 3 of division Div0, and three adjustment regions Aa belonging to division 1, division 2, and division 3 of division Div1. In the drawing, the six adjustment regions Aa are shown by dot patterns.

The adjustment unit 63 updates the adjustment values corresponding to the six adjustment regions Aa to the second adjustment value. Since the adjustment value is "1.00" in the initial state, the second adjustment value is a value updated by multiplying the adjustment value in the initial state by b. That is, the second adjustment value=(1.00, which is the adjustment value in the initial state)×b, which is the second weight factor=b. The adjustment unit 63 can update only the second adjustment values corresponding to the six adjustment regions Aa to b. Note that the adjustment unit 63 does not update the adjustment values corresponding to the remaining adjustment regions Aa and leaves the above adjustment values at "1.00".

For example, in a case where a severe read retry occurs in the target sector SCav, the adjustment unit 63 can update the adjustment value to the second adjustment value. This can prevent or reduce the occurrence of severe read retries in the surrounding region of the target sector SCav.

Next, a case in which the detector 62 detects the first abnormality information will be described.

As shown in FIG. 9 and FIG. 1, for example, the nonvolatile memory 90 (storage unit) further stores a first weight factor a, a first length r1, and a first width 11. For example, the weight factor is the first weight factor a, the length r is the first length r1, the width l is the first width 11, and the range RA is a first range RA1. The first range RA1 is a range of the first recording layer Ya1 with the first length r1 in the radial direction dr1 and the first width 11 in the circumferential direction (track direction).

The detector 62 can detect a sector that has become an unrecovered state. Here, the unrecovered state refers to a state in which the data in the recording layer Y has become unrecoverable. When the data in the recording layer Y is unrecoverable, it means that the data in the recording layer Y is in a state where the refresh processing cannot be performed satisfactorily (original data in the recording layer Y cannot be read).

For example, the detector 62 detects the first abnormality information indicating that the target data in the target sector SCav has become unrecoverable. In such a case, the adjustment unit 63 positions the first range RA1 so that the center of gravity CE of the first range RA1 is located in the target sector SCav. Then, the adjustment unit 63 multiplies all of the adjustment values corresponding to all of the adjustment regions Aa that overlap the first range RA1 among the plurality of adjustment regions Aa by the first weight factor a, and updates each adjustment value multiplied by the first weight factor a to a first adjustment value.

In a case where a read error occurs in the target sector SCav, the adjustment unit 63 can update the adjustment value of each of all adjustment regions Aa overlapping the first range RA1 extended in the radial direction dr1 and the circumferential direction centered on the target sector SCav to the first adjustment value.

The adjustment unit 63 updates the adjustment value corresponding to the adjustment region Aa that overlaps the first range RA1 to the first adjustment value. Since the adjustment value is "1.00" in the initial state, the first adjustment value is a value updated by multiplying the adjustment value in the initial state by a. That is, the first adjustment value=(1.00, which is the adjustment value in the initial state)×a, which is the first weight factor=a. The adjustment unit 63 can update only the adjustment value corresponding to the adjustment region Aa overlapping the first range RA1 to a. Note that the adjustment unit 63 does not update the adjustment values corresponding to the remaining adjustment regions Aa and leaves the above adjustment values at "1.00".

For example, in a case where the target sector SCav becomes an unrecovered state, the target sector SCav is excluded from the read and write processing thereafter, and the target sector SCav is replaced with an alternative sector in a spare region. Although the target sector SCav cannot be recovered, the adjustment unit 63 can update the adjustment value to the first adjustment value. This can prevent or reduce the occurrence of sectors that become an unrecovered state in the surrounding region of the target sector SCav. For example, in a case where the target sector SCav is in a region with the scratch SR in FIG. 6, it is possible to prevent or reduce other sectors in the region with the scratch SR from becoming unrecovered. Scratches on the disk DK can be the scratches SR that are already on the magnetic disk device 1 at the beginning of its use, or scratches that are made after the magnetic disk device 1 has started to be used.

There are other possible causes other than scratches that can easily cause the surrounding region of the target sector SCav to become an unrecovered state. For example, the characteristics of the head HD may deteriorate, making it difficult to read data in the recording layer Y as a whole. In such a case, regions in the recording layer Y that originally had poor characteristics tend to become an unrecovered state.

Alternatively, a case in which intensive write processing is performed in a specific region of the recording layer Y may be considered.

Next, a case in which the detector 62 detects the third abnormality information will be described.

As shown in FIG. 9 and FIG. 1, for example, the nonvolatile memory 90 (storage unit) further stores a third weight factor c, a third length r3, and a third width 13. For example, the weight factor is the third weight factor c, the length r is the third length r3, the width 1 is the third width 13, and the range RA is a third range RA3. The third range RA3 is a range of the first recording layer Ya1 with the third length r3 in the radial direction dr1 and the third width 13 in the circumferential direction (track direction).

The detector 62 can detect that a read retry has occurred during the refresh processing. For example, the detector 62 detects the third abnormality information indicating that a read of the target data in the target sector SCav was retried. In such a case, the adjustment unit 63 positions the third range RA3 so that the center of gravity CE of the third range RA3 is located in the target sector SCav. Then, the adjustment unit 63 multiplies all of the adjustment values corresponding to all of the adjustment regions Aa that overlap the third range RA3 among the plurality of adjustment regions Aa by the third weight factor c, and updates each adjustment value multiplied by the third weight factor c to a third adjustment value.

In a case where a read retry occurs during the refresh processing of the target sector SCav, the adjustment unit 63 can update the adjustment value of each of all adjustment regions Aa overlapping the third range RA3 extended in the radial direction dr1 and the circumferential direction centered on the target sector SCav to the third adjustment value.

The adjustment unit 63 updates the adjustment value corresponding to the adjustment region Aa that overlaps the third range RA3 to the third adjustment value. Since the adjustment value is "1.00" in the initial state, the third adjustment value is a value updated by multiplying the adjustment value in the initial state by c. That is, the third adjustment value=(1.00, which is the adjustment value in the initial state)×c, which is the third weight factor=c. The adjustment unit 63 can update only the adjustment value corresponding to the adjustment region Aa overlapping the third range RA3 to c. Note that the adjustment unit 63 does not update the adjustment values corresponding to the remaining adjustment regions Aa and leaves the above adjustment values at "1.00".

For example, in a case where a read retry occurs during the refresh processing of the target sector SCav, the adjustment unit 63 can update the adjustment value to the third adjustment value. This can prevent or reduce the occurrence of read retries during the refresh processing in the surrounding region of the target sector SCav. For example, in a case where the target sector SCav is in a region with scratches SR in FIG. 6, the occurrence of read retries during the refresh processing can be prevented or reduced in other sectors in the region with scratches SR.

The ATI rewrite count is a numerical value obtained by dividing the reference count in the reference table TL1 by the adjustment value in the adjustment table TL2. The ATI rewrite count adjusted based on the first adjustment value above is a first ATI rewrite count. ATI rewrite count adjusted based on the third adjustment value above shall be a third ATI rewrite count. Then, for example, the first ATI rewrite count may be less than the third ATI rewrite count. In such a case, the relationship between the first weight factor a and the third weight factor c becomes a>c>+1.00.

However, the magnitude relation between the first weight factor a and the third weight factor c and the magnitude relationship between the first ATI rewrite count and the third ATI rewrite count are not limited to the above example and can be varied in various ways.

Next, a case in which the detector 62 detects the fourth abnormality information will be described.

As shown in FIG. 9 and FIG. 1, for example, the nonvolatile memory 90 (storage unit) further stores a fourth weight factor d, a fourth length r4, and a fourth width 14. For example, the weight factor is the fourth weight factor d, the length r is the fourth length r4, the width 1 is the fourth width 14, and the range RA is a fourth range RA4. The fourth range RA4 is a range of the first recording layer Ya1 with the fourth length r4 in the radial direction dr1 and the fourth width 14 in the circumferential direction (track direction).

The detector 62 can detect errors in the head HD. For example, the detector 62 detects the fourth abnormality information indicating that the deterioration amount of the head HD1 characteristics has exceeded the head characteristics threshold value in the head characteristics table TL4. In such a case, the adjustment unit 63 positions the fourth range RA4 so that the center of gravity CE of the fourth range RA4 is located in a specific sector SCa. Then, the adjustment unit 63 multiplies all of the adjustment values corresponding to all of the adjustment regions Aa that overlap the fourth range RA4 among the plurality of adjustment regions Aa by the fourth weight factor d, and updates each adjustment value multiplied by the fourth weight factor d to a fourth adjustment value.

The detector 62 can detect errors in the head HD from measurements for knowing the characteristics of the head HD at regular intervals.

In a case where an error occurs in the head HD1, the adjustment unit 63 can update the adjustment value of each of all adjustment regions Aa overlapping the fourth range RA4 extended in the radial direction dr1 and the circumferential direction centered on the specific sector SCa to the fourth adjustment value.

The adjustment unit 63 updates the adjustment value corresponding to the adjustment region Aa overlapping the fourth range RA4 to the fourth adjustment value. Since the adjustment value is "1.00" in the initial state, the fourth adjustment value is a value updated by multiplying the adjustment value in the initial state by d. In other words, the fourth adjustment value=(1.00, which is the adjustment value in the initial state)×d, which is the fourth weight factor=d. The adjustment unit 63 can update only the adjustment value corresponding to the adjustment region Aa overlapping the fourth range RA4 to d. The adjustment unit 63 does not update the adjustment values corresponding to the remaining adjustment regions Aa and leaves the above adjustment values at "1.00".

In the present embodiment, the fourth range RA4 overlaps all the adjustment regions Aa of the first recording layer Ya1. Therefore, in a case where the detector 62 detects the fourth abnormality information, the adjustment unit 63 can update all adjustment values in the adjustment table TL2 to the fourth adjustment value. Therefore, the occurrence of head errors can be prevented or reduced. In the present embodiment, the fourth range RA4 is the largest among the first range RA1 to the fourth range RA4.

Here, the deterioration amount of the head HD characteristics is defined as a. The ATI rewrite count adjusted based on the above fourth adjustment value shall be a fourth ATI rewrite count. The fourth ATI rewrite count is a numerical value obtained by dividing the reference count in the reference table TL1 by the product of the fourth adjustment value (e.g., d) and the above a.

As described above, the adjustment unit 63 can update the adjustment value each time the detector 62 detects the first to fourth abnormality information. For example, in a case where the detector 62 detects the first abnormality information again in the adjustment region Aa where the adjustment value has already been updated to the first adjustment value, "a", the adjustment unit 63 can further update the first adjustment value to "$a^2$" by multiplying the first adjustment value, "a", by the first weight factor a.

The timing of triggering refresh around a region where abnormality has occurred can then be accelerated, thus avoiding read errors of data in the first recording layer Ya1.

The magnetic disk device 1 of the present embodiment is configured as described above.

Figure 11:
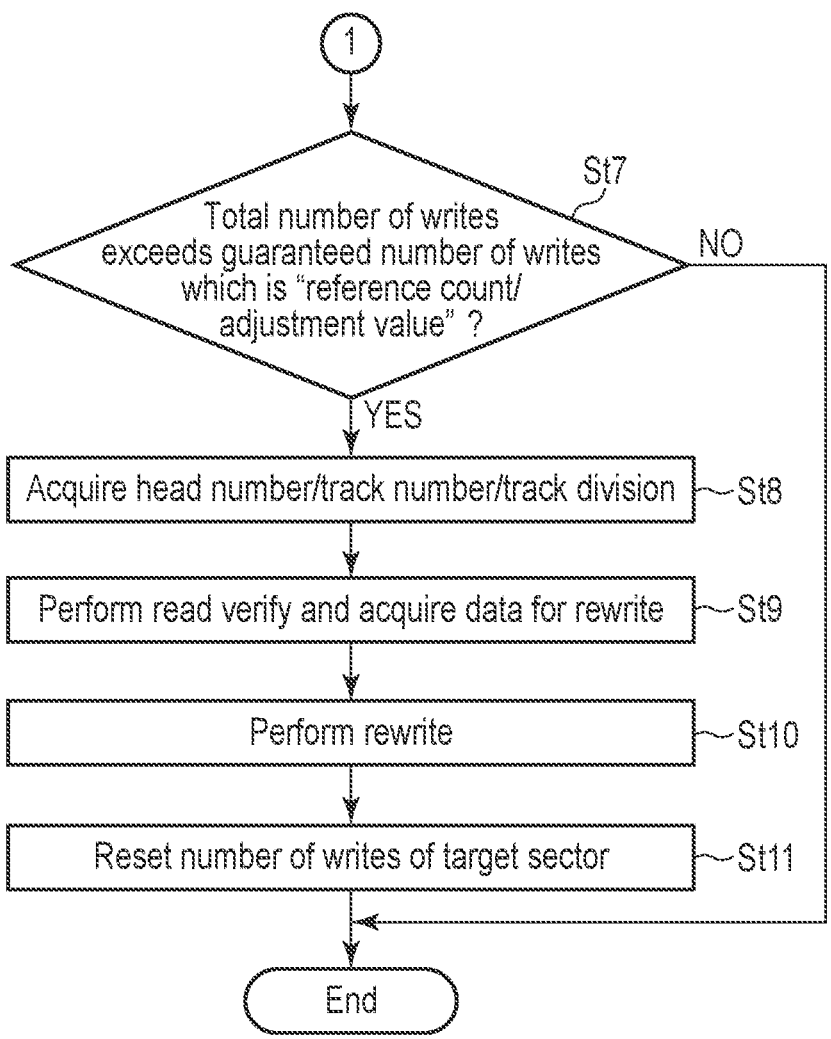
FIG. 11 is a flowchart for explaining the refresh processing method following FIG. 10.

Next, the refresh processing method will be explained. FIG. 10 and FIG. 11 are flowcharts for explaining the refresh processing method applied to the magnetic disk device 1.

As shown in FIG. 10, FIG. 1, and FIG. 4, when the refresh processing method is started, first, in step St1, the write processing unit 61a performs write processing to the sector SCa(v−1), and, in step St2, the detector 62 acquires information of the sector SCa(v−1) to which the write processing was performed. Then, in step St3, the counter 64 acquires a write counter value, and, in step St4, the adjustment unit 63 acquires an adjustment value (ATI added value or value for accelerating ATI refresh) from the adjustment table TL2.

Next, in step St5, the counter 64 acquires a reference count from the reference table TL1 and a count addition factor from the nonvolatile memory 90 (storage unit). As a result, in step St6, the counter 64 counts the number of writes of the sector SCav as "1.0" times, "1.5" times, etc., as described above, and updates the total number of writes of the sector SCav (write count value).

As shown in FIG. 11, FIG. 1, and FIG. 4, then, in step St7, it is determined whether or not the total number of writes of the sector SCav has exceeded the ATI rewrite count (a numerical value obtained by dividing the reference count by the adjustment value). In a case where the total number of writes does not exceed the ATI rewrite count (step St7), the refresh processing method is ended without triggering a refresh.

On the other hand, in a case where the total number of writes exceeds the ATI rewrite count (step St7), the processing moves to step St8, in which the refresh processing unit 66 acquires information on the sector SCa where the number of writes was counted. Then, in step St9, the refresh processing unit 66 performs read verify and acquires data for rewriting the sector SCa. Then, in step St10, the refresh processing unit 66 rewrites original data of the sector SCa to the sector SCa.

Thereafter, in step St10, the refresh processing unit 66 resets the number of writes of the sector SCa recorded in the nonvolatile memory 90 (storage unit) to "0" times and ends the refresh processing method. The total number of writes for the sector SCa is also set to "0" times. As described above, in a case where the total number of writes exceeds the ATI rewrite count, the refresh can be triggered and the refresh processing method ended.

Figure 12:
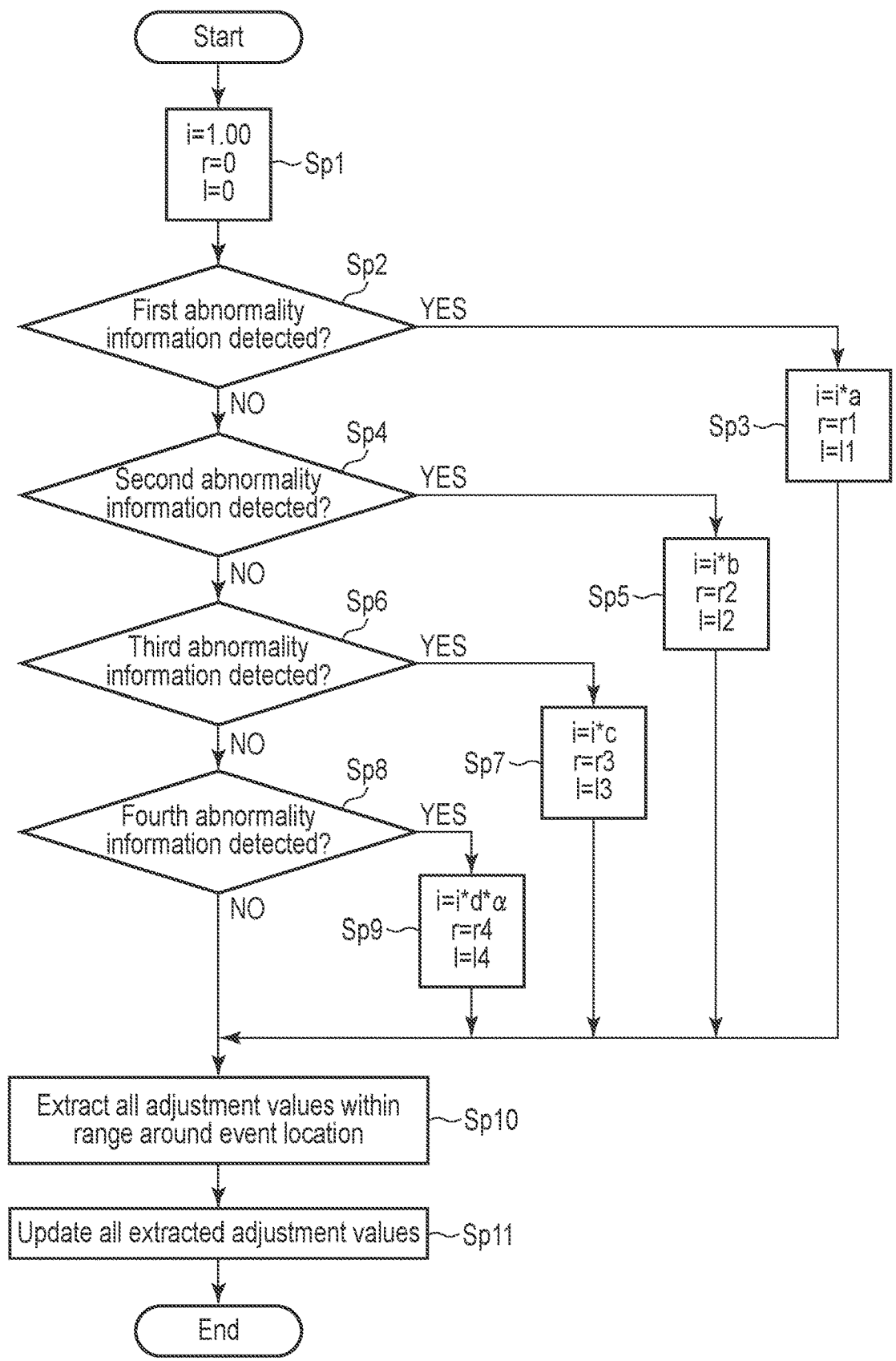
FIG. 12 is a flowchart for explaining a method of adjusting ATI rewrite count applied to the magnetic disk device.

Next, a method of adjusting the ATI rewrite count is explained. FIG. 12 is a flowchart for explaining the method of adjusting the ATI rewrite count applied to the magnetic disk device 1.

As shown in FIG. 12 and FIG. 1, when an event occurs and the method of adjusting the ATI rewrite count is started, first, in step Sp1, the adjustment value in the adjustment table TL2 is "1.00", and the range RA is not set. Then, in step Sp2, it is determined whether or not the detector 62 has detected the first abnormality information.

In a case where the detector 62 has detected the first abnormality information (step Sp2), the processing moves to step Sp3, in which the adjustment unit 63 updates the weight factor to the first weight factor a, the length r to the first length r1, the width 1 to the first width 11, and moves to step Sp10.

On the other hand, in a case where the detector 62 has not detected the first abnormality information (step Sp2), the processing moves to step Sp4, in which the detector 62 determines whether or not the second abnormality information has been detected.

In a case where the detector 62 has detected the second abnormality information (step Sp4), the processing moves to step Sp5, in which the adjustment unit 63 updates the weight factor to the second weight factor b, the length r to the second length r2, the width 1 to the second width 12, and moves to step Sp10.

On the other hand, in a case where the detector 62 has not detected the second abnormality information (step Sp4), the processing moves to step Sp6, in which the detector 62 determines whether or not the third abnormality information has been detected.

In a case where the detector 62 has detected the third abnormality information (step Sp6), the processing moves to step Sp7, in which the adjustment unit 63 updates the weight factor to the third weight factor c, the length r to the third length r3, the width 1 to the third width 13, and moves to step Sp10.

On the other hand, in a case where the detector 62 has not detected the third abnormality information (step Sp6), the processing moves to step Sp8, in which the detector 62 determines whether or not the fourth abnormality information has been detected.

In a case where the detector 62 has detected the fourth abnormality information (step Sp8), the processing moves to step Sp9, in which the adjustment unit 63 updates the weight factor to the fourth weight factor d, the length r to the fourth length r4, the width 1 to the fourth width 14, and moves to step Sp10.

On the other hand, in a case where the detector 62 has not detected the fourth abnormality information (step Sp8), the processing moves to step Sp10.

Next, in step Sp10, the adjustment unit 63 extracts all adjustment values within the range RA around the location where the event has occurred. Then, in step Sp11, the adjustment unit 63 updates all the extracted adjustment values to "a", "b", "c", or "d". This completes the method of adjusting the ATI rewrite count. Note that, in a case where the detector 62 detects none of the first to fourth abnormality information (step Sp8), the method of adjusting the ATI rewrite count may be ended without moving to step Sp10.

According to the magnetic disk device 1 and the method of adjusting the ATI rewrite count configured as described above, the magnetic disk device 1 has the reference table TL1 holding a plurality of reference counts. In a case where the reference count continues to be used as the ATI rewrite count, there is a risk that the ATI refresh operation may not be able to keep up.

Therefore, the magnetic disk device 1 is further equipped with the adjustment table TL2 holding a plurality of adjustment values. The adjustment table TL2 has a higher resolution than the reference table TL1. During the period after the manufacturing of the magnetic disk device 1 is ended and the user is using the magnetic disk device 1, the adjustment unit 63 can update the adjustment table TL2 and adjust the ATI rewrite count based on the first to fourth abnormality information detected by the detector 62. The adjustment unit 63 can independently adjust the ATI rewrite count for each subdivided regions (adjustment region Aa) of the recording layer Y. When any one of the first to fourth abnormality information is detected, the adjustment unit 63 can adjust the ATI rewrite count of all the adjustment regions Aa that overlap the range RA among the plurality of adjustment regions Aa.

The adjustment unit 63 can increase the frequency of refresh processing only in a region (adjustment region Aa) where read errors are likely to occur. This can avoid read errors in the data of the recording layer Y. When adjusting the ATI rewrite count, the adjustment unit 63 adjusts the ATI rewrite count only for the minimum number of adjustment regions Aa among the plurality of adjustment regions Aa. Since the ATI rewrite count is not adjusted more than necessary, the triggering of the refresh processing, which causes delay in the command processing, can be minimized, and the performance deterioration of the magnetic disk device 1 can be minimized.

As described above, it is possible to obtain a magnetic disk device 1 and a method for adjusting the ATI rewrite count capable of adjusting the ATI rewrite count.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, the techniques described above may be applied to a shingled write magnetic recording magnetic disk device and a hybrid recording magnetic disk device that selects and executes the conventional magnetic recording and the shingled write magnetic recording. For example, in the hybrid recording, the user data area U of the recording layer Y has a shingled write magnetic recording region on the inner circumference side and a conventional magnetic recording region on the outer circumference side of the shingled write magnetic recording region. This conventional magnetic recording region is sometimes referred to as a conventional zone, and can be a region where frequently rewritten data such as system files and metadata are recorded.

What is claimed is:

1. A magnetic disk device comprising:
a disk having a recording layer, the recording layer including a plurality of divided regions, which are m regions, in a case of being divided into m pieces in at least one of a radial direction and a circumferential direction, and a plurality of adjustment regions, which are n regions, in a case of being divided into n regions, which is larger in number than the m regions, in at least one of the directions;
a head that writes data to the recording layer and reads data from the recording layer;
a storage unit storing a reference table holding a plurality of reference counts corresponding to the recording layer and an adjustment table holding a plurality of adjustment values corresponding to the recording layer, wherein the plurality of reference counts are m reference counts corresponding one-to-one to the plurality of divided regions, and the plurality of adjustment values are n adjustment values corresponding one-to-one to the plurality of adjustment regions; and
a controller,
wherein
the controller comprises:
a detector that detects a state of the recording layer and a characteristic of the head;
an adjustment unit that, in a case where the detector detects normality information indicating that the state and the characteristic are normal, adjusts each of the reference counts to a ATI rewrite count having the same numerical value as the reference count without updating each of the adjustment values, and, in a case where the detector detects abnormality information indicating that one of the state and the characteristic is abnormal, updates a corresponding adjustment value among the plurality of adjustment values and adjusts a corresponding reference count among the plurality of reference counts based on the corresponding adjustment value to the ATI rewrite count having a numerical value different from the reference count;
a counter that, each time data is written to an adjacent sector adjacent to a target sector of the recording layer in a radial direction, counts number of writes in the target sector and records the number of writes in the storage unit;

a determination unit that determines whether or not a total number of the writes recorded in the storage unit exceeds the ATI rewrite count; and a refresh processing unit that, when the total exceeds the ATI rewrite count, reads target data in the target sector, rewrites the target data to the target sector, and resets the number of writes of the target sector recorded in the storage unit.

2. The magnetic disk device of claim 1, wherein the storage unit further stores a first weight factor, the detector detects first abnormality information in a case where data in the recording layer becomes unrecoverable, and when a first range of the recording layer has a first length in the radial direction and a first width in the circumferential direction, in a case where the detector detects the first abnormality information indicating that the target data in the target sector has become unrecoverable, the adjustment unit positions the first range so that a center of gravity of the first range is located in the target sector, multiplies all adjustment values corresponding to all adjustment regions overlapping the first range among the plurality of adjustment regions by the first weight factor, and updates each of the adjustment values multiplied by the first weight factor to a first adjustment value.

3. The magnetic disk device of claim 1, wherein the controller further comprises a read processing unit that reads data in the recording layer, the storage unit further stores a read retry table having a second weight factor and a read retry threshold value, the detector detects second abnormality information in a case where the number of times the same data in the recording layer is read by the read processing unit exceeds the read retry threshold value, and when a second range of the recording layer has a second length in the radial direction and a second width in the circumferential direction, in a case where the detector detects the second abnormality information indicating that the number of reads of the target data in the target sector exceeds the read retry threshold value, the adjustment unit positions the second range so that a center of gravity of the second range is located in the target sector, multiplies all adjustment values corresponding to all adjustment regions overlapping the second range among the plurality of adjustment regions by the second weight factor, and updates each of the adjustment values multiplied by the second weight factor to a second adjustment value.

4. The magnetic disk device of claim 1 wherein the storage unit further stores a third weight factor, the detector detects third abnormality information in a case where the refresh processing unit retries reading data in the recording layer, and when a third range of the recording layer has a third length in the radial direction and a third width in the circumferential direction, in a case where the detector detects the third abnormality information indicating that the read of the target data in the target sector has been retried, the adjustment unit positions the third range so that a center of gravity of the third range is located in the target sector, multiplies all adjustment values corresponding to all adjustment regions overlapping the third range among the plurality of adjustment regions by the third weight factor, and updates each of the adjustment values multiplied by the third weight factor to a third adjustment value.

5. The magnetic disk device of claim 4, wherein the storage unit further stores a first weight factor, the detector detects first abnormality information in a case where data in the recording layer becomes unrecoverable, when a first range of the recording layer has a first length in the radial direction and a first width in the circumferential direction, in a case where the detector detects the first abnormality information indicating that the target data in the target sector has become unrecoverable, the adjustment unit positions the first range so that a center of gravity of the first range is located in the target sector, multiplies all adjustment values corresponding to all adjustment regions overlapping the first range among the plurality of adjustment regions by the first weight factor, and updates each of the adjustment values multiplied by the first weight factor to a first adjustment value, the ATI rewrite count is a numerical value obtained by dividing the reference count by the adjustment value, when the first weight factor is a, the third weight factor is c, the ATI rewrite count adjusted based on the first adjustment value is a first ATI rewrite count, and the ATI rewrite count adjusted based on the third adjustment value is a third ATI rewrite count, $a > c > +1$ is established, and the first ATI rewrite count is less than the third ATI rewrite count.

6. The magnetic disk device of claim 1, wherein the storage unit further stores a head characteristics table holding a fourth weight factor and a head characteristics threshold value, the detector detects fourth abnormality information in a case where the amount of deterioration of the head characteristics exceeds the head characteristics threshold value, and when a fourth range of the recording layer has a fourth length in the radial direction and a fourth width in the circumferential direction, in a case where the detector detects the fourth abnormality information indicating that the amount of deterioration of the head characteristics exceeds the head characteristics threshold value, the adjustment unit positions the fourth range so that a center of gravity of the fourth range is located in a specific sector, multiplies all adjustment values corresponding to all adjustment regions overlapping the fourth range among the plurality of adjustment regions by the fourth weight factor, and updates each of the adjustment values multiplied by the fourth weight factor to a fourth adjustment value.

7. The magnetic disk device of claim 6, wherein the fourth range overlaps all adjustment regions of the recording layer, and in a case where the detector detects the fourth abnormality information, the adjustment unit updates all adjustment values in the adjustment table to the fourth adjustment value.

8. The magnetic disk device of claim 6, wherein when the fourth weight factor is d, an amount of deterioration of the head characteristics is $\alpha$, and the ATI rewrite count adjusted based on the fourth adjustment value is a fourth ATI rewrite count, the fourth ATI rewrite count is a numerical value obtained by dividing the reference count by a product of the fourth adjustment value and $\alpha$.

9. The magnetic disk device of claim 1, wherein
in a case where abnormality information is detected by the detector, the ATI rewrite count adjusted based on the updated adjustment value is a numerical value smaller than the corresponding reference count.

10. A method of adjusting ATI rewrite count, which is applied to a magnetic disk device comprising: a disk having a recording layer, the recording layer including a plurality of divided regions, which are m regions, in a case of being divided into m pieces in at least one of a radial direction and a circumferential direction, and a plurality of adjustment regions, which are n regions, in a case of being divided into n regions, which is larger in number than the m regions, in at least one of the directions; a head that writes data to the recording layer and reads data from the recording layer; a storage unit storing a reference table holding a plurality of reference counts corresponding to the recording layer and an adjustment table holding a plurality of adjustment values corresponding to the recording layer, wherein the plurality of reference counts are m reference counts corresponding one-to-one to the plurality of divided regions, and the plurality of adjustment values are n adjustment values corresponding one-to-one to the plurality of adjustment regions; and a controller, the method comprising:

detecting a state of the recording layer and characteristics of the head;

in a case of detecting normality information indicating that the state and the characteristic are normal, adjusting each of the reference counts to an ATI rewrite count having the same numerical value as the reference count without updating each of the adjustment values, and, in a case of detecting abnormality information indicating that one of the state and the characteristic is abnormal, updating a corresponding adjustment value among the plurality of adjustment values and adjusting a corresponding reference count among the plurality of reference counts based on the corresponding adjustment value to the ATI rewrite count having a numerical value different from the reference count;

each time data is written to an adjacent sector adjacent to a target sector of the recording layer in a radial direction, counting number of writes in the target sector and recording the number of writes in the storage unit;

determining whether or not a total number of the writes recorded in the storage unit exceeds the ATI rewrite count; and when the total exceeds the ATI rewrite count, reading target data in the target sector, rewriting the target data to the target sector, and resetting the number of writes of the target sector recorded in the storage unit.

* * * * *